Smith & Underwood,
Root Cutter.
No. 104,218.  Patented June 14, 1870.
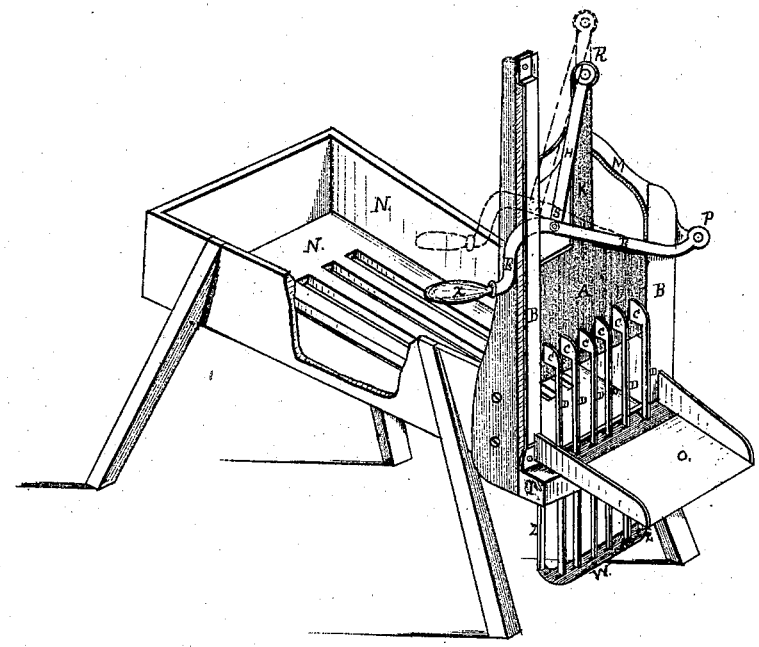
Witnesses:
Pierrepont Bartow.
William H. Fisher.
Joint Inventors,
John F. Smith
Harrison Underwood.

United States Patent Office.

JOHN F. SMITH AND HARRISON UNDERWOOD, OF WESTMORELAND, NEW YORK.

Letters Patent No. 104,218, dated June 14, 1870.

IMPROVEMENT IN ROOT-CUTTERS.

The Schedule referred to in these Letters Patent and making part of the same.

*To all whom it may concern:*

Be it known that we, JOHN F. SMITH and HARRISON UNDERWOOD, both of the town of Westmoreland, in the county of Oneida and State of New York, have invented an Improved Root-Cutter, of which the following is a specification.

Nature and Objects of our Invention.

The first part of our invention relates to the combination of a long knife, whose edge is either at right angles to, or at an oblique angle with, the perpendicular, and a frame, in such a manner that the knife can be made to slide easily up or down.

The object of this part of our invention is to cut the roots or vegetables completely through at one descent of the knife.

The second part of our invention relates to the combination of this long knife and one or more short knives, placed at a right or an oblique angle to the side of this long knife, in such a manner that the short knives shall be capable of being raised or lowered simultaneously with the long knife.

The object of this part of our invention is to cut the roots into small pieces by a transverse and longitudinal cutting simultaneously made.

The third part of our invention relates to the placing one or more guards in a line with the end of the short knives, in such a manner that the guard or guards shall be capable of preventing the vegetables or roots from passing from under the knives until properly cut.

Description of the Accompanying Drawing.

The figure represented in the accompanying drawing is a perspective view of a machine embodying our invention.

General Description.

A (see drawing) is a long knife, having its blade at its under side.

B B are slides or grooves, holding the knife A in its place, and permitting it to slide up and down.

We do not deem this particular method of supporting the knife by the frame essential, but claim the right to make the frame support the knife in other ways, as, *e. g.*, having a groove in the sides of the knife, and in the frame a tongue fitting into the groove, &c.

C C C, &c, are short knives fastened to the long knife A obliquely or transversely.

Each of D D D, &c., is a guard, connected, at its upper end, with one of the short knives C, and running through the sill T. This sill T serves as a guide to the guards.

The guards C C, &c., may be attached to the short knives, or attached in some other manner, and may be immovable, while the short knives move, the mode of attachment being immaterial so long as they retain their relative positions to the short knives, and perform the office of guards.

E is a bent lever, having a handle, X, and working upon a pivot-fulcrum at P.

H is a rod, attached at its lower end to the lever E by a pivot, S, and at its upper end to the shaft K by the pivot R.

K is a shaft, connected at its lower extremity with the long knife A, and sliding within and supported by the frame M.

We do not deem the configuration of frame M as essential.

N is a box, with longitudinal openings in the bottom.

O is a spout beyond the knives.

Z Z and W are braces for the guards C C, &c.

Mode of Operation.

The manner in which our root-cutter operates is as follows:

Roots or vegetables are placed in the box N. The dirt upon and around them sifts through the openings in the bottom of the box. The roots are then pressed forward under the knives, and against the guards. The lever E is then depressed, which, by the rod H and shaft R, brings down all the knives simultaneously upon the roots, and cutting them into small pieces. The knives being lifted, the same operation is repeated, the vegetables already cut being forced along, between the guards, out into the spout O, by the uncut vegetables, which are pressed up to the guards.

The dotted lines represent the position of the lever, rod and shaft, when elevated.

One of the advantages of our root-cutter is, it is capable of cutting a number of roots or vegetables into small and regular pieces by one or two depressions of the knives.

Claims.

We claim—

1. The combination of the long knife A and the frame B B, substantially as described, and for the purposes hereinbefore set forth.

2. The combination of the long knife A and one or more short knives, C C, substantially as described, and for the purposes hereinbefore set forth.

3. The placing of one or more guards, D D D; substantially as described, and for the purposes hereinbefore mentioned.

JOHN F. SMITH.
HARRISON UNDERWOOD.

Witnesses:
E. B. HASTINGS,
WM. H. FISHER.